(12) United States Patent
Lin et al.

(10) Patent No.: US 6,573,780 B2
(45) Date of Patent: Jun. 3, 2003

(54) FOUR-PHASE CHARGE PUMP WITH LOWER PEAK CURRENT

(75) Inventors: Yu Shen Lin, Taipei (TW);
Chun-Hsiung Hung, Hsinchu (TW);
Ray-Lin Wan, Fremont, CA (US)

(73) Assignee: Macronix International Co., Ltd., Hsinchu (TW)

( * ) Notice: Subject to any disclaimer, the term of this patent is extended or adjusted under 35 U.S.C. 154(b) by 0 days.

(21) Appl. No.: 09/355,654
(22) PCT Filed: Feb. 2, 1999
(86) PCT No.: PCT/US99/02259
§ 371 (c)(1),
(2), (4) Date: Aug. 2, 1999
(87) PCT Pub. No.: WO00/46648
PCT Pub. Date: Aug. 10, 2000

(65) Prior Publication Data
US 2003/0006824 A1 Jan. 9, 2003

(51) Int. Cl.[7] .............................. G05F 1/10; G05F 3/02
(52) U.S. Cl. ........................................ 327/536; 327/589
(58) Field of Search ................................ 327/392, 394, 327/396, 398, 399, 401, 261, 288, 264, 536, 589

(56) References Cited

U.S. PATENT DOCUMENTS

| 4,837,466 A | * | 6/1989 | Kanauchi ..................... 327/288 |
| 5,381,051 A | * | 1/1995 | Morton ........................ 327/390 |
| 5,585,765 A | | 12/1996 | O'Shaughnessy ........... 331/111 |
| 5,589,793 A | | 12/1996 | Kassapian .................... 327/536 |
| 5,754,476 A | * | 5/1998 | Caser et al. ................. 327/536 |
| 5,818,289 A | | 10/1998 | Chevalier et al. ........... 327/536 |
| 5,982,223 A | * | 11/1999 | Park et al. ................... 327/536 |

FOREIGN PATENT DOCUMENTS

| EP | 0 594 293 A2 | 4/1994 |
| WO | WO 97/23037 | 6/1997 |

* cited by examiner

Primary Examiner—Terry D. Cunningham
Assistant Examiner—Quan Tra
(74) Attorney, Agent, or Firm—Mark A. Haynes; Haynes Beffel & Wolfeld LLP

(57) ABSTRACT

A four-phase charge pump circuit suitable for use on integrated circuits, such as flash memory devices, includes circuitry that drives charge pump nodes in two components separated by a time delay. The two components can be triggered by edges from the clocks that control the timing of the charge pump. Driving the charge pump nodes in two components separated by a delay decreases the peak current of the charge pump and improves noise characteristics of a voltage supply or ground line connected to the charge pump.

26 Claims, 13 Drawing Sheets

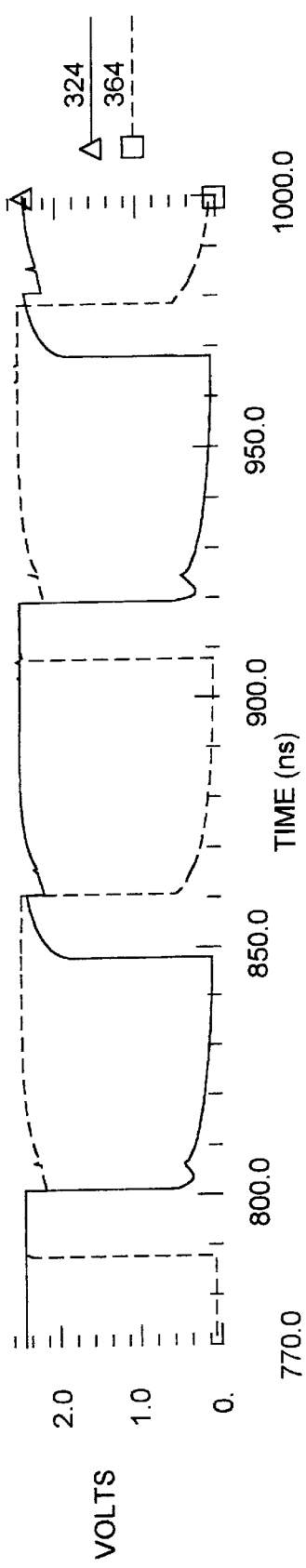
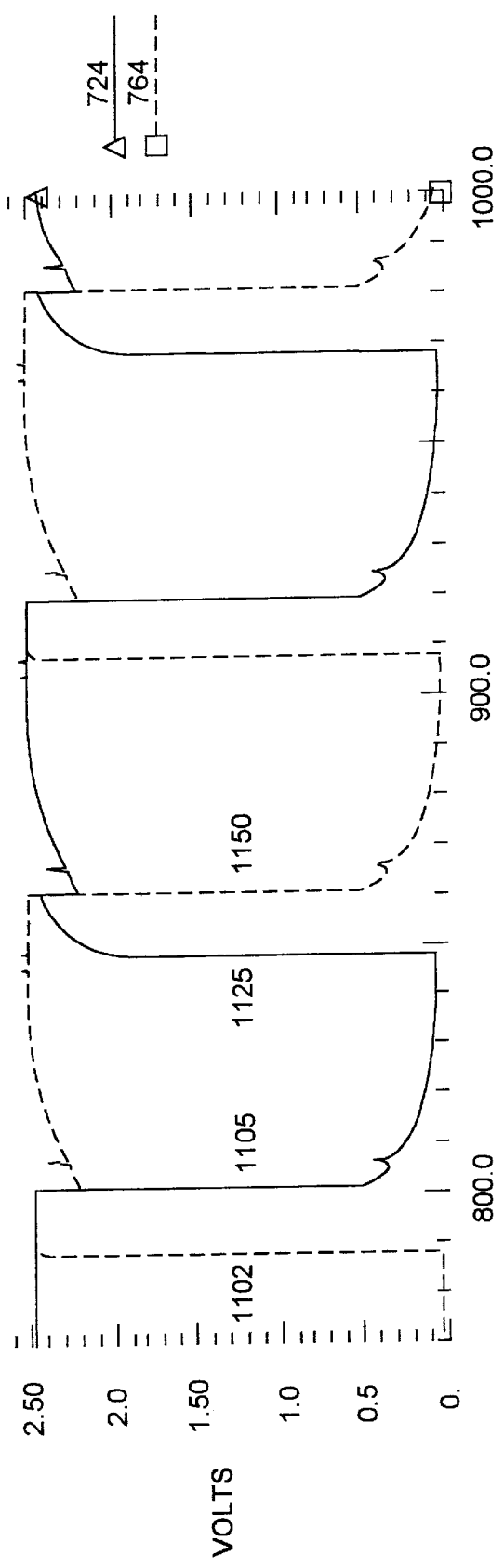
FIG. 8A
FIG. 8B

FOUR-PHASE CHARGE PUMP WITH LOWER PEAK CURRENT

BACKGROUND OF THE INVENTION

1. Field of the Invention

This invention relates to the field of charge pump circuits, and to integrated circuits using charge pumps to produce on-chip voltages outside the range of the off-chip voltage supply.

2. Description of the Related Art

A charge pump generates a great deal of power supply and ground noise at times when peak currents drive the charge pump. In the event that the power supply line or the ground line is shared between the charge pump and another analog circuit block on the same chip, the other analog circuit block will suffer from the power supply or ground noise generated by the charge pump. Further, flash memory architecture and mixed mode integrated circuit architecture often has a power supply or ground line shared between a charge pump and another analog circuit block. What is needed is a charge pump that generates less power supply and ground noise, especially when the power supply line and/or the ground line is shared between the charge pump and another analog circuit.

FIG. 1 illustrates a block diagram of a charge pump 100. In FIG. 1, clock signal circuitry 200 provides pump timing signals 210 to a pump timing circuit 300. Pump timing circuit 300 provides amplified pump timing signals to pump stages 400. Pump timing circuit 300 is coupled to a voltage supply 302 and a ground 304.

FIG. 2 schematically illustrates the pump timing circuit 300. The pump timing circuit 300 includes four series of inverters: a first inverter series 310, a second inverter series 330, a third inverter series 350, and a fourth inverter series 370.

The first inverter series 310 includes an input 312, a first inverter 314, a second inverter 316, a third inverter 318, a fourth inverter 320, and an output 322. The input 312 is connected to the input of the first inverter 314. The first inverter 314, the second inverter 316, the third inverter 318, and the fourth inverter 320 are connected in series. The output of the fourth inverter 320 is connected to the output 322. The output 322 provides an amplified first pump clock signal 324.

The second inverter series 330 includes an input 332, a fifth inverter 334, a sixth inverter 336, a seventh inverter 338, an eighth inverter 340, and an output 342. The input 332 is connected to the input of the fifth inverter 334. The fifth inverter 334, the sixth inverter 336, the seventh inverter 338, and the eighth inverter 340 are connected in series. The output of the eighth inverter 340 is connected to the output 342. The output 342 provides an amplified second transfer clock signal 344.

The third inverter series 350 includes an input 352, a ninth inverter 354, a tenth inverter 356, an eleventh inverter 358, a twelfth inverter 360, and an output 362. The input 352 is connected to the input of the ninth inverter 354. The ninth inverter 354, the tenth inverter 356, the eleventh inverter 358, and the twelfth inverter 360 are connected in series. The output of the twelfth inverter 360 is connected to the output 362. The output 362 provides an amplified second pump clock signal 364.

The fourth inverter series 370 includes an input 372, a thirteenth inverter 374, a fourteenth inverter 376, a fifteenth inverter 378, a sixteenth inverter 380, and an output 382. The input 372 is connected to the input of the thirteenth inverter 374. The thirteenth inverter 374, the fourteenth inverter 376, the fifteenth inverter 378, and the sixteenth inverter 380 are connected in series. The output of the sixteenth inverter 380 is connected to the output 382. The output 382 provides an amplified first transfer clock signal 384.

The following table details the length and width dimensions of the p-channel and n-channel transistors for some of the inverters in the pump timing circuit 300.

| Inverter | P-channel width ($\mu$m) | P-channel length ($\mu$m) | N-channel width ($\mu$m) | N-channel length ($\mu$m) |
| --- | --- | --- | --- | --- |
| fourth inverter 320 | 800 | 0.5 | 300 | 0.5 |
| twelfth inverter 360 | 800 | 0.5 | 300 | 0.5 |

FIG. 3 schematically illustrates pump stages 400. Pump stages 400 includes an input 410, a first stage 430, a second stage 450, a third stage 470, a diode 490, and an output 420. The input 410, the first stage 430, the second stage 450, the third stage 470, the diode 490, and the output 420 are connected in series. The input 410 is 110 coupled to the voltage supply 302 (VDD) and the first stage 430.

The first stage 430 includes a first transistor 432, a second transistor 436, a first transfer capacitor 438, and a first pump capacitor 442. The first transistor 432 is an n-channel transistor having a gate, a source connected to node 434, and a drain connected to the input 410. The second transistor 436 is an n-channel transistor having a gate connected to node 434, a source connected to the gate of the first transistor 432, and a drain connected to the drain of the first transistor 432. The first transfer capacitor 438 is a capacitor-connected n-channel transistor having a first terminal connected to the fourth inverter series output 382 and a second terminal connected to the gate of the first transistor 432. The first pump capacitor 442 has a first terminal connected to the first inverter series output 322 and a second terminal connected to node 434.

The second stage 450 includes a third transistor 452, a fourth transistor 456, a second transfer capacitor 458, and a second pump capacitor 462. The third transistor 452 is an n-channel transistor having a gate, a source connected to node 454, and a drain connected to node 434. The fourth transistor 456 is an n-channel transistor having a gate connected to node 454, a source connected to the gate of the third transistor 452, and a drain connected to the drain of the third transistor 452. The second transfer capacitor 458 is a capacitor-connected n-channel transistor having a first terminal connected to the second inverter series output 342 and a second terminal connected to the gate of the third transistor 452. The second pump capacitor 462 has a first terminal connected to the third inverter series output 362 and a second terminal connected to node 454.

The third stage 470 includes a fifth transistor 472, a sixth transistor 476, a third transfer capacitor 478, and a third pump capacitor 482. The fifth transistor 472 is an n-channel transistor having a gate, a source connected to node 474, and a drain connected to node 454. The sixth transistor 476 is an n-channel transistor having a gate connected to node 474, a source connected to the gate of the fifth transistor 472, and a drain connected to the drain of the fifth transistor 472. The third transfer capacitor 478 is a capacitor-connected n-channel transistor having a first terminal connected to the fourth inverter series output 382 and a second terminal connected to the gate of the fifth transistor 472. The third pump capacitor 482 has a first terminal connected to the first inverter series output 322 and a second terminal connected to node 474.

Diode 490 is a diode-connected n-channel transistor having a first terminal connected to node 474 and a second terminal connected to the pump stages output 420.

Heretofore, the requirement for a charge pump with less power supply noise and less ground noise has not been fully met. What is needed is a solution that simultaneously addresses both of these requirements.

SUMMARY OF THE INVENTION

A primary goal of the invention is to provide a charge pump that has less power supply noise. Another primary goal of the invention is to provide a charge pump having less ground noise. Another primary goal of the invention is to provide a charge pump which overcomes inefficiencies of older designs.

A charge pump comprises a first timing circuit supplying a timing signal from a timing signal output and each of the charge pump stages receive a timing signal via a capacitor, charge is pumped to an output in response to a timing signal made of two components separated by a delay. Current usually flows in the same direction during both components of the timing signal, and the power of the timing signal increases from the onset of the second component. The power of the timing signal increases due to the use of the second component to couple the capacitor to a voltage source, a current source, or a ground.

According to another aspect of the invention, the charge pump pumps charge in response to several timing signals. In a preferred embodiment, the onsets of the first and second components are defined by distinct edges of the timing signals. The onsets can be defined by several clock signals.

In another aspect of the invention, two transistors and two capacitors form a charge pump boost stage. In a preferred embodiment, two clock signals drive one of the capacitors. An amplification circuit can increase the power of one or both of the clock signals, and a diode can be coupled to the output of the charge pump.

In further aspects of the invention, a second charge pump stage is added and a third charge pump stage is added to define a four-phase charge pump. In yet further aspects of the invention, one or both of two transfer clock signals can be used to drive one or more of the pump capacitors in the four-phase charge pump. According to yet other aspects of the invention, an integrated circuit is provided including the charge pump on a single chip.

A method for reducing a magnitude of a peak current flowing in a charge pump comprises driving a charge pump node with a first timing signal having a polarity, and driving the node with a second timing signal having the polarity, such that the onsets of the first and second timing signals are separated by a delay. Another method for reducing a magnitude of a peak current flowing in a charge pump comprises driving a charge pump node by activating a current handling device coupled the node through a capacitor, and after a delay, driving the node by activating a second current handling device coupled to the node through the capacitor, while the first current handling device remains activated.

BRIEF DESCRIPTION OF THE FIGURES

FIG. 8A is a timing diagram of amplified pump timing signals supplied by a pump timing circuit.

FIG. 8B is a timing diagram of amplified pump timing signals supplied by a pump timing circuit.

All figures showing timing diagrams illustrate the same time frame, from about 770 nanoseconds to about 1 microsecond.

DETAILED DESCRIPTION

Figure 1:
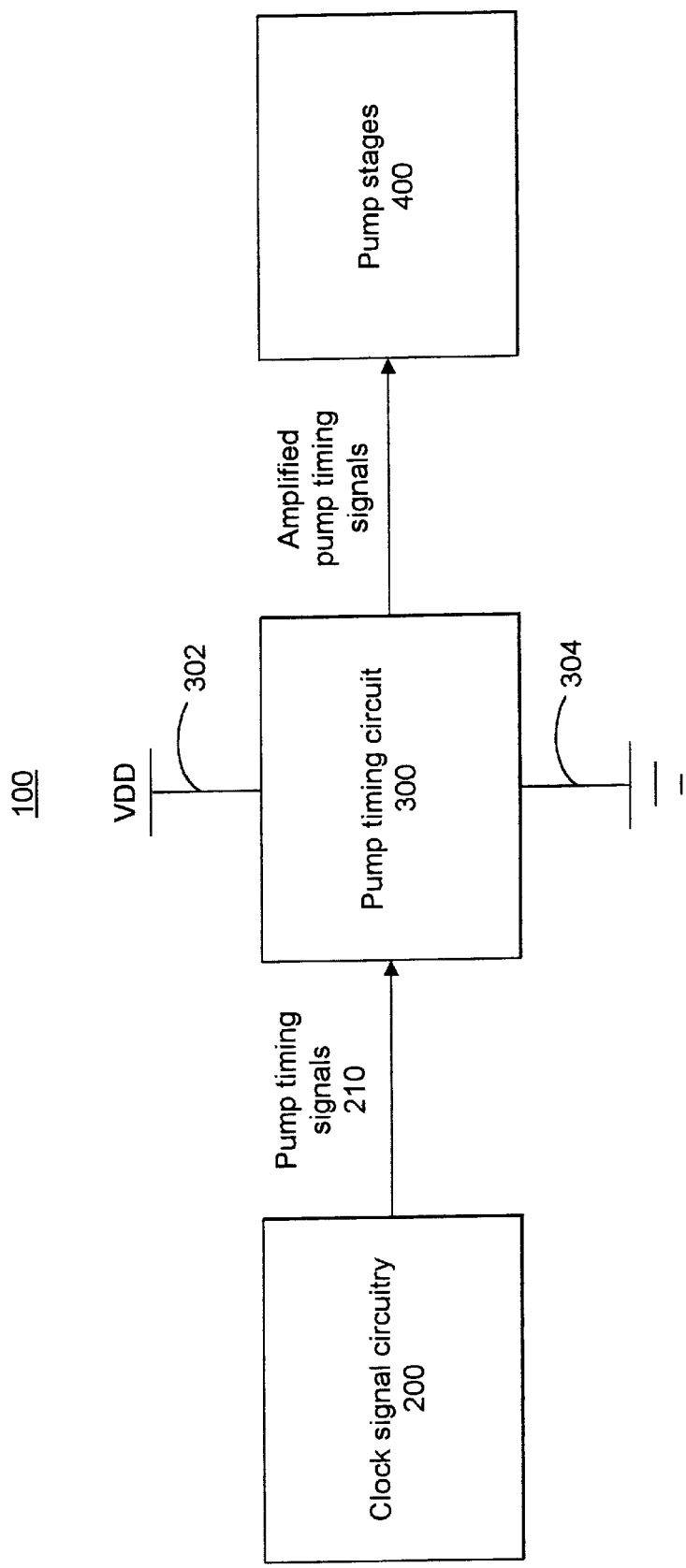
FIG. 1 is a block diagram of a known charge pump.
Figure 2:
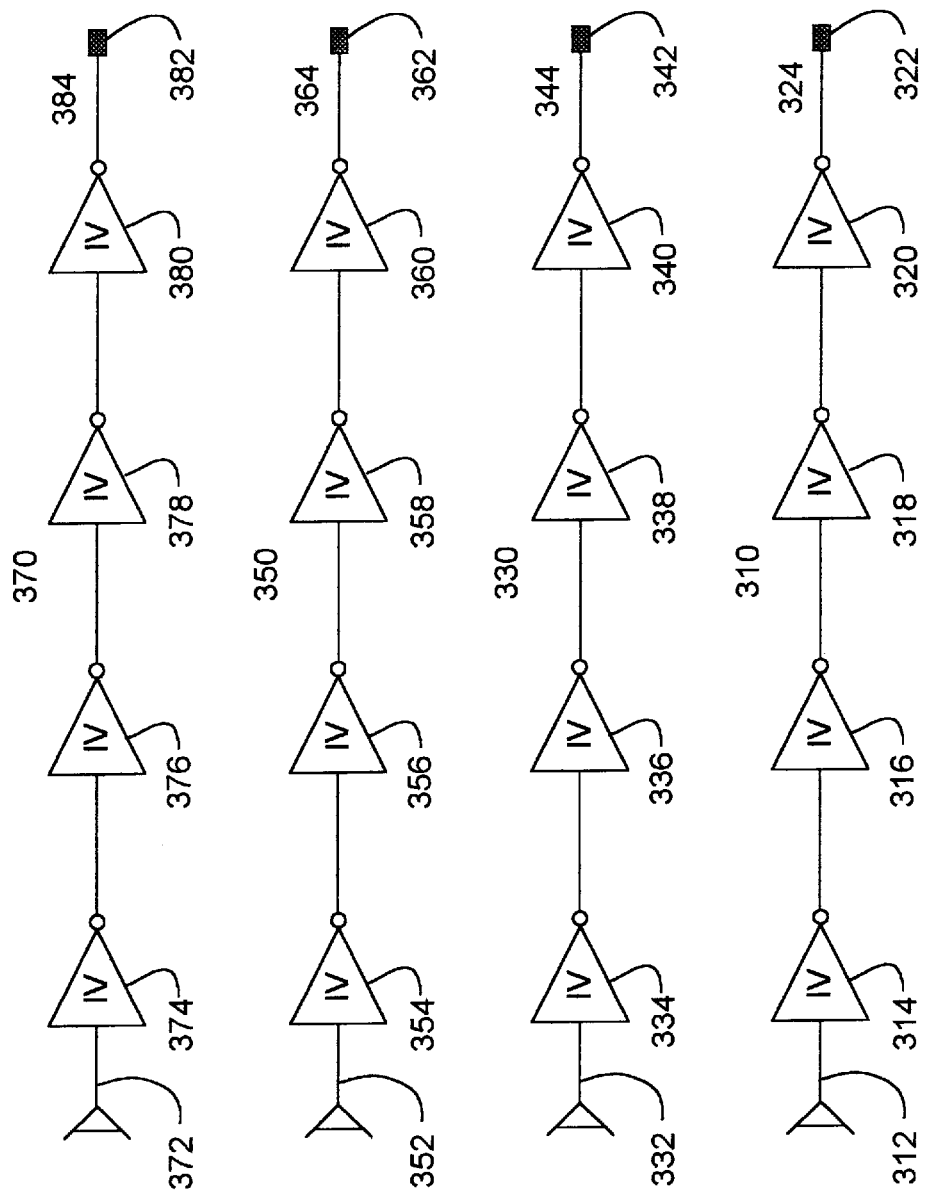
FIG. 2 is a circuit diagram of a known pump timing circuit.
Figure 3:
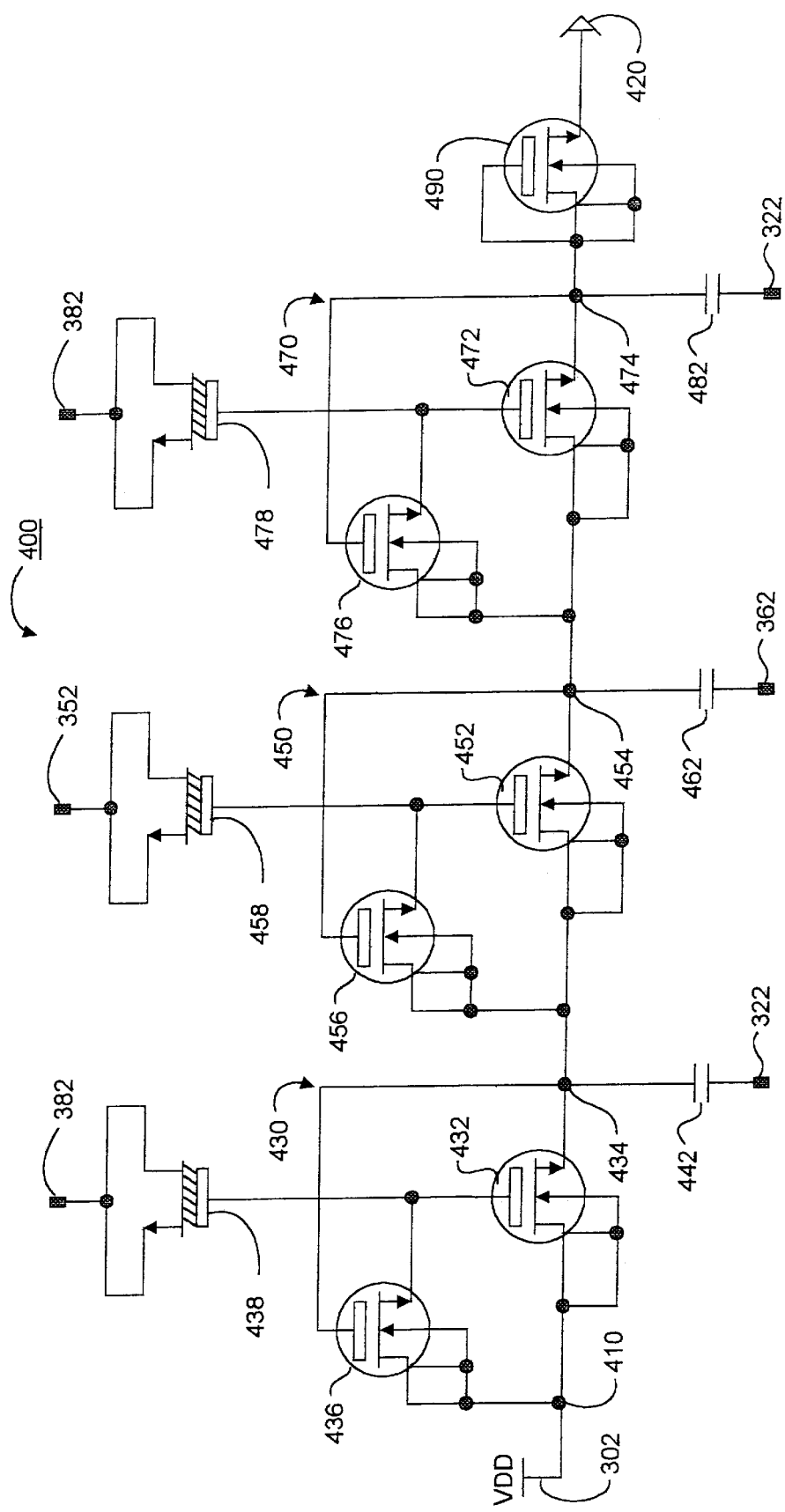
FIG. 3 is a circuit diagram of a known series of pump stages.
Figure 4:
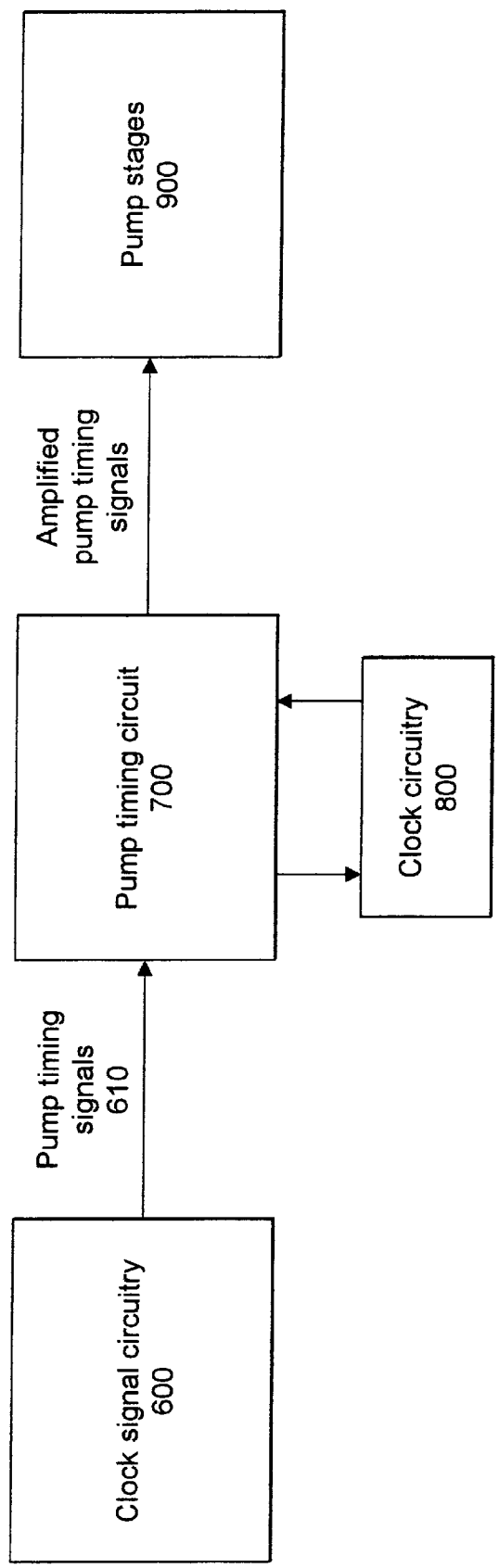
FIG. 4 is a block diagram of a charge pump representing an embodiment of the invention.

FIG. 4 illustrates a block diagram of the charge pump with lower peak current according to the present invention. In FIG. 4, a clock signal circuitry 600 provides pump timing signals 610 to a pump timing circuit 700. Pump timing circuit 700 provides amplified pump timing signals to pump stages 900. Clock circuitry 800 processes signals internal to the pump timing circuit 700 and contributes to processing the pump timing signals 610 into amplified pump timing signals.

Figure 5:
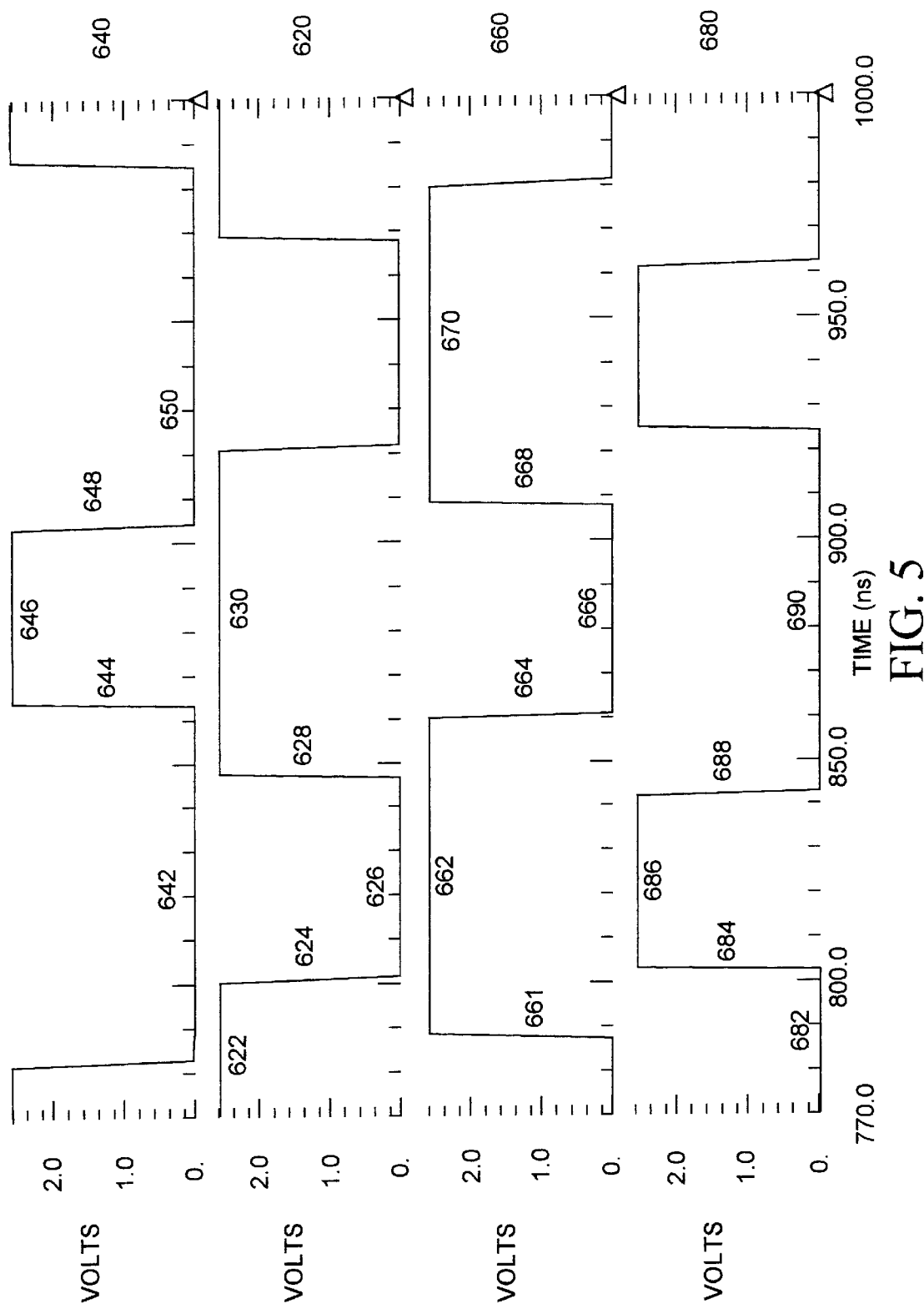
FIG. 5 is a timing diagram illustrating pump timing signals.

FIG. 5 is a voltage versus time timing diagram of pump timing signals 610 provided by clock signal circuitry 600. Pump timing signals 610 include four periodic pulse trains: a first pump clock signal 620, a second transfer clock signal 640, a second pump clock signal 660, and a first transfer clock signal 680. Parts of the first pump clock signal 620 are high level 622, falling edge 624, low level 626, rising edge 628, and high level 630. Parts of the second transfer clock signal 640 are low level 642, rising edge 644, high level 646, falling edge 648, and low level 650. Parts of the second pump clock signal 660 are rising edge 661, high level 662, falling edge 664, low level 666, rising edge 668, and high level 670. Parts of the first transfer clock signal 680 are low level 682, rising edge 684, high level 686, falling edge 688, and low level 690.

Figure 6:
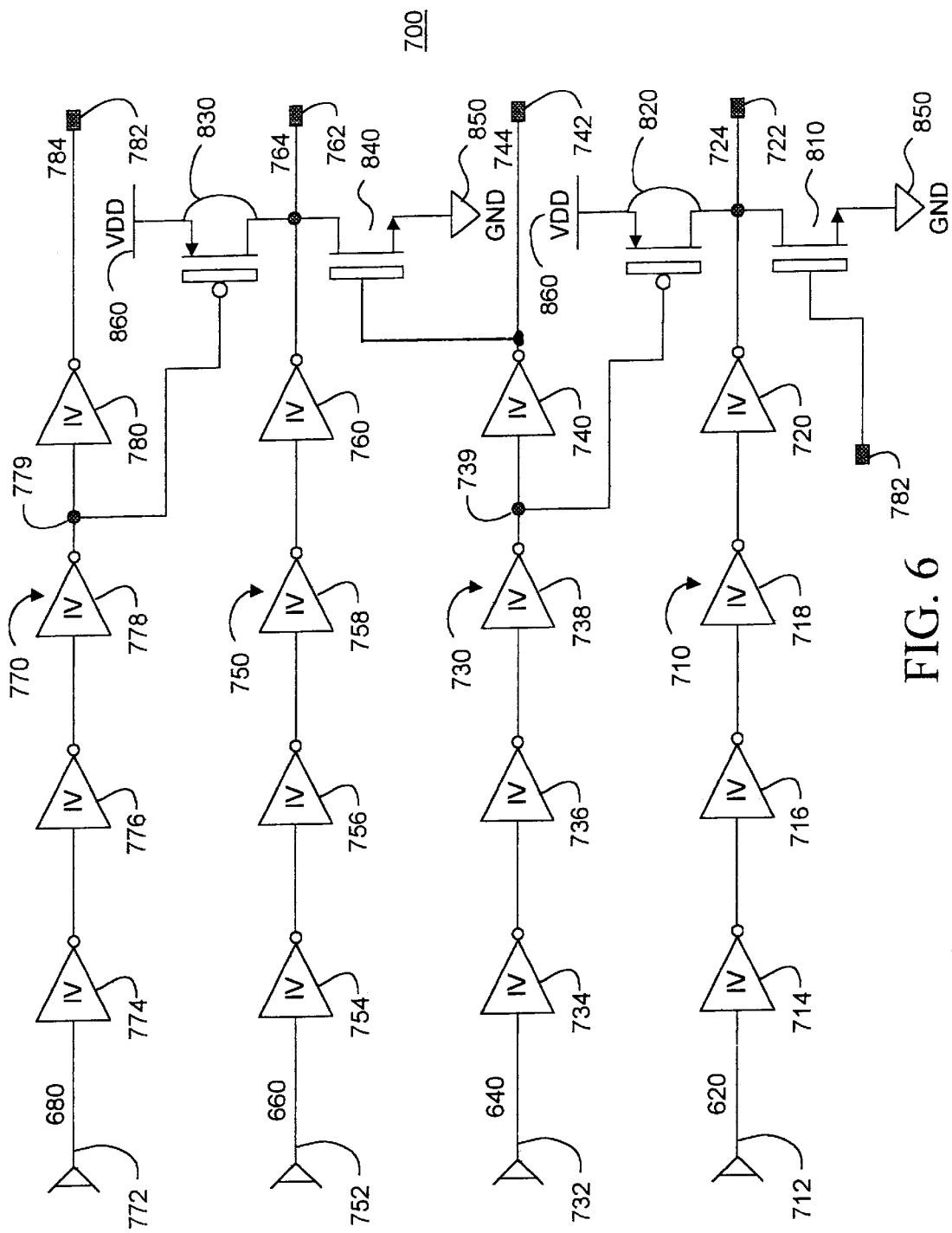
FIG. 6 is a circuit diagram of a pump timing circuit and clock circuitry.

FIG. 6 schematically illustrates pump timing circuit 700 and clock circuitry 800. Pump timing circuit 700 produces amplification by stepping through inverters of generally increasing transistor widths. Pump timing circuit 700 includes four series of inverters: a first inverter series 710, a second inverter series 730, a third inverter series 750, and a fourth inverter series 770.

The first inverter series 710 includes an input 712, a first inverter 714, a second inverter 716, a third inverter 718, a fourth inverter 720, and an output 722. The input 712 receives the first pump clock signal 620. The input 712 is connected to the input of the first inverter 714. The first inverter 714, the second inverter 716, the third inverter 718, and the fourth inverter 720 are connected in series. The output of the fourth inverter 720 is connected to the output 722. The output 722 provides an amplified first pump clock signal 724.

The second inverter series 730 includes an input 732, a fifth inverter 734, a sixth inverter 736, a seventh inverter 738, an eighth inverter 740, and an output 742. The input 732 receives the second transfer clock signal 640. The input 732 is connected to the input of the fifth inverter 734. The fifth inverter 734, the sixth inverter 736, the seventh inverter 738, and the eighth inverter 740 are connected in series. The output of the seventh inverter 738 and the input of the eighth inverter 740 are connected to node 739. The output of the eighth inverter 740 is connected to the output 742. The output 742 provides an amplified second transfer clock signal 744.

The third inverter series 750 includes an input 752, a ninth inverter 754, a tenth inverter 756, an eleventh inverter 758, a twelfth inverter 760, and an output 762. The input 752 receives the second pump clock signal 660. The input 752 is connected to the input of the ninth inverter 754. The ninth inverter 754, the tenth inverter 756, the eleventh inverter 758, and the twelfth inverter 760 are connected in series. The output of the twelfth inverter 760 is connected to the output 762. The output 762 provides an amplified second pump clock signal 764.

The fourth inverter series 770 includes an input 772, a thirteenth inverter 774, a fourteenth inverter 776, a fifteenth inverter 778, a sixteenth inverter 780, and an output 782. The input 772 receives the first transfer clock signal 680. The input 772 is connected to the input of the thirteenth inverter 774. The thirteenth inverter 774, the fourteenth inverter 776, the fifteenth inverter 778, and the sixteenth inverter 780 are connected in series. The output of the fifteenth inverter 778 and the input of the sixteenth inverter 780 are connected to node 779. The output of the sixteenth inverter 780 is connected to the output 782. The output 782 provides an amplified first transfer clock signal 784.

The following table details examples of the length and width dimensions of the p-channel and n-channel transistors for the inverters in the pump timing circuit 700. Of course, the invention is not limited to these examples.

| Inverter | P-channel width (μm) | P-channel length (μm) | N-channel width (μm) | N-channel length (μm) |
| --- | --- | --- | --- | --- |
| first inverter 714 | 6 | 0.5 | 3 | 0.5 |
| second inverter 716 | 26 | 0.5 | 13 | 0.5 |
| third inverter 718 | 80 | 0.5 | 40 | 0.5 |
| fourth inverter 720 | 400 | 0.5 | 100 | 0.5 |
| fifth inverter 734 | 6 | 0.5 | 3 | 0.5 |
| sixth inverter 736 | 26 | 0.5 | 13 | 0.5 |
| seventh inverter 738 | 80 | 0.5 | 40 | 0.5 |
| eighth inverter 740 | 40 | 0.5 | 20 | 0.5 |
| ninth inverter 754 | 6 | 0.5 | 3 | 0.5 |
| tenth inverter 756 | 26 | 0.5 | 13 | 0.5 |
| eleventh inverter 758 | 80 | 0.5 | 40 | 0.5 |
| twelfth inverter 760 | 400 | 0.5 | 100 | 0.5 |
| thirteenth inverter 774 | 6 | 0.5 | 3 | 0.5 |
| fourteenth inverter 776 | 26 | 0.5 | 13 | 0.5 |
| fifteenth inverter 778 | 80 | 0.5 | 40 | 0.5 |
| sixteenth inverter 780 | 40 | 0.5 | 20 | 0.5 |

The second inverter series 730 and the fourth inverter series 770 are coupled to the first inverter series output 722 and the third inverter series output 762 through routing transistors. Clock circuitry 800 includes a first routing transistor 810, a second routing transistor 820, a third routing transistor 830, a fourth routing transistor 840, a ground 850, and a voltage supply 860. The first routing transistor 810 is an n-channel transistor with a gate connected to the fourth inverter series output 782, a source connected to ground 850, and a drain connected to the first inverter series output 722. The second routing transistor 820 is a p-channel transistor with a gate connected to node 739, a source connected to voltage supply 860, and a drain connected to the first inverter series output 722. The third routing transistor 830 is a p-channel transistor with a gate connected to node 779, a source connected to voltage supply 860, and a drain connected to the third inverter series output 762. The fourth routing transistor 840 is an n-channel transistor with a gate connected to the second inverter series output 742, a source connected to ground 850, and a drain connected to the third inverter series output 762.

The following table details examples of the length and width dimensions of the p-channel and n-channel transistors for the routing transistors in clock circuitry 800. Of course, the invention is not limited to these examples.

| Transistor | Width (μm) | Length (μm) |
| --- | --- | --- |
| first routing transistor 810 | 200 | 0.5 |
| second routing transistor 820 | 400 | 0.5 |
| third routing transistor 830 | 400 | 0.5 |
| fourth routing transistor 840 | 200 | 0.5 |

It can be appreciated that in the above examples, the sum of the widths of the first routing transistor 810 and the n-channel transistor in the fourth inverter 720 corresponds to the width of the n-channel transistor in the fourth inverter 320. The sum of the width of the second routing transistor 820 and the p-channel transistor in the fourth inverter 720 corresponds to the width of the p-channel transistor in the fourth inverter 320. The sum of the widths of the third routing transistor 830 and the p-channel transistor in the twelfth inverter 760 corresponds to the width of the p-channel transistor in the twelfth inverter 360. The sum of the widths of the fourth routing transistor 840 and the n-channel transistor in the twelfth inverter 760 corresponds to the width of the n-channel transistor in the twelfth inverter 360.

Figure 7:
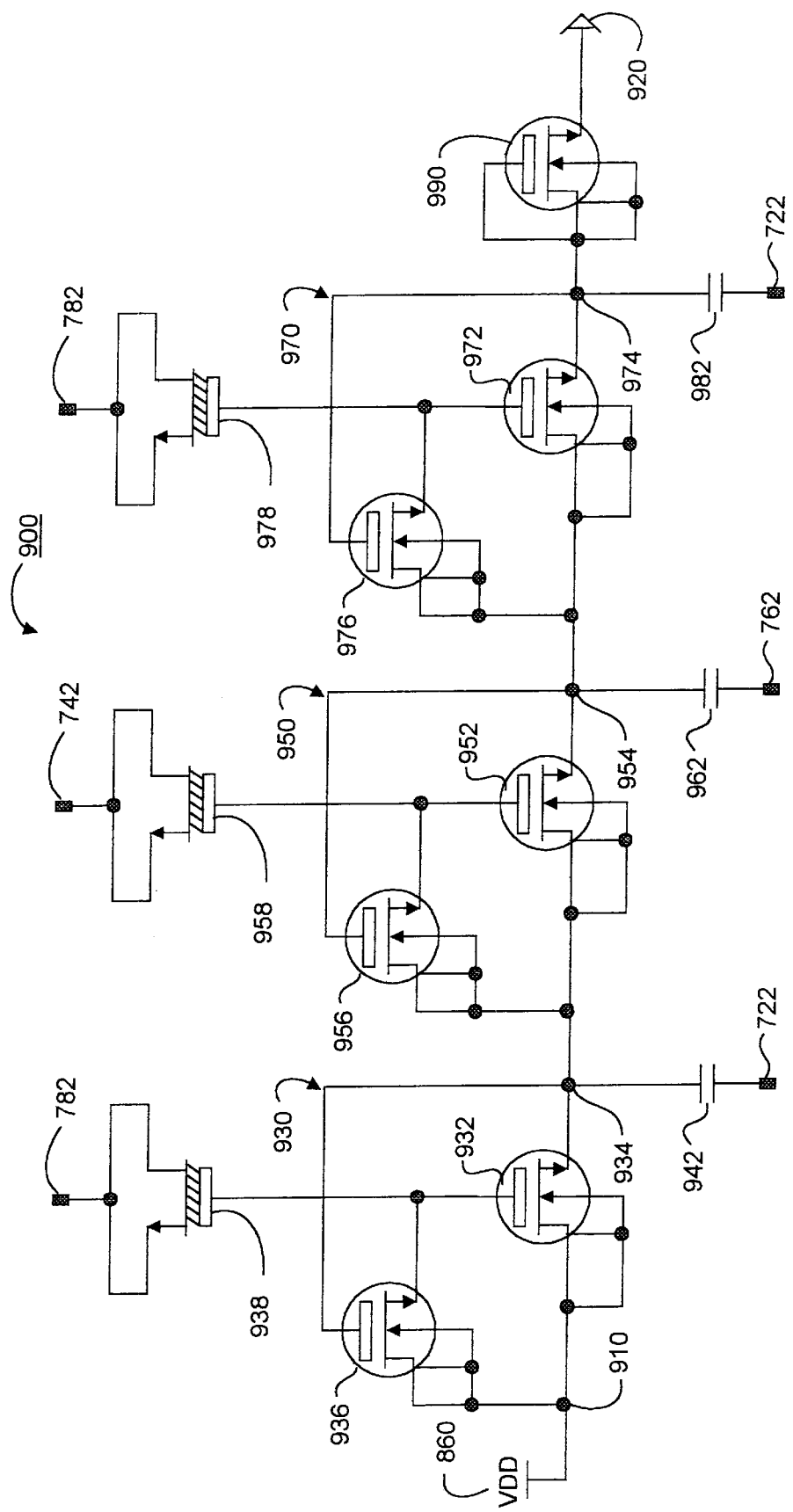
FIG. 7 is a circuit diagram of pump stages.

FIG. 7 schematically illustrates pump stages 900. Triple well transistors are indicated with a circled transistor. Transistors having a thick gate oxide are indicated by a transistor with a rectangle for the gate. Transistors having a lower threshold voltage due to masking during implantation of extra impurities are indicated by a transistor with a hatched rectangle.

Pump stages 900 includes an input 910, a first stage 930, a second stage 950, a third stage 970, a diode 990, and an output 920. The input 910, the first stage 930, the second stage 950, the third stage 970, the diode 990, and the output 920 are connected in series. The input 910 is coupled to the voltage supply 860 and the first stage 930.

The first stage 930 includes a first transistor 932, a second transistor 936, a first transfer capacitor 938, and a first pump capacitor 942. The first transistor 932 is an n-channel triple well transistor with a thick gate oxide having a gate, a source connected to node 934, and a drain connected to the input 910. The second transistor 936 is an n-channel triple well transistor with a thick gate oxide having a gate connected to node 934, a source connected to the gate of the first transistor 932, and a drain connected to the drain of the first transistor 932. The first transfer capacitor 938 is a capacitor-connected n-channel transistor with a thick gate oxide and a lower threshold voltage having a first terminal connected to the fourth inverter series output 782 and a second terminal connected to the gate of the first transistor 932. The first pump capacitor 942 is a 200 picofarad capacitor having a first terminal connected to the first inverter series output 722 and a second terminal connected to node 934.

The second stage 950 includes a third transistor 952, a fourth transistor 956, a second transfer capacitor 958, and a second pump capacitor 962. The third transistor 952 is an n-channel triple well transistor with a thick gate oxide having a gate, a source connected to node 954, and a drain connected to node 934. The fourth transistor 956 is an n-channel triple well transistor with a thick gate oxide having a gate connected to node 954, a source connected to the gate of the third transistor 952, and a drain connected to the drain of the third transistor 952. The second transfer capacitor 958 is a capacitor-connected n-channel transistor with a thick gate oxide and a lower threshold voltage having a first terminal connected to the second inverter series output 742 and a second terminal connected to the gate of the third transistor 952. The second pump capacitor 962 is a 200 picofarad capacitor having a first terminal connected to the third inverter series output 762 and a second terminal connected to node 954.

The third stage 970 includes a fifth transistor 972, a sixth transistor 976, a third transfer capacitor 978, and a third pump capacitor 982. The fifth transistor 972 is an n-channel triple well transistor with a thick gate oxide having a gate, a source connected to node 974, and a drain connected to node 954. The sixth transistor 976 is an n-channel triple well transistor with a thick gate oxide having a gate connected to node 974, a source connected to the gate of the fifth transistor 972, and a drain connected to the drain of the fifth transistor 972. The third transfer capacitor 978 is a capacitor-connected n-channel transistor with a thick gate oxide and a lower threshold voltage having a first terminal connected to the fourth inverter series output 782 and a second terminal connected to the gate of the fifth transistor 972. The third pump capacitor 982 is a 200 picofarad capacitor having a first terminal connected to the first inverter series output 722 and a second terminal connected to node 974.

Diode 990 is a diode-connected n-channel triple well transistor with a thick gate oxide having a first terminal connected to node 974 and a second terminal connected to the pump stages output 920.

The following table details some examples of the length and width dimensions of the n-channel transistors in pump stages 900. Of course, the invention is not limited to the examples.

| Transistor | Width ($\mu$m) | Length ($\mu$m) |
| --- | --- | --- |
| first transistor 932 | 130 | 0.8 |
| second transistor 936 | 20 | 0.8 |
| first transfer capacitor 938 | 40 | 40 |
| third transistor 952 | 130 | 0.8 |
| fourth transistor 956 | 20 | 0.8 |
| second transfer capacitor 958 | 40 | 40 |
| fifth transistor 972 | 130 | 0.8 |
| sixth transistor 976 | 20 | 0.8 |
| third transfer capacitor 978 | 40 | 40 |
| diode 990 | 130 | 0.8 |

FIG. 8A is a timing diagram displaying voltage versus time for the amplified first pump clock signal 324 and the amplified second pump clock signal 364 provided by pump timing circuit 300. FIG. 8B is a timing diagram displaying voltage versus time for the amplified first pump clock signal 724 and the amplified second pump clock signal 764 provided by pump timing circuit 700.

Figure 9:
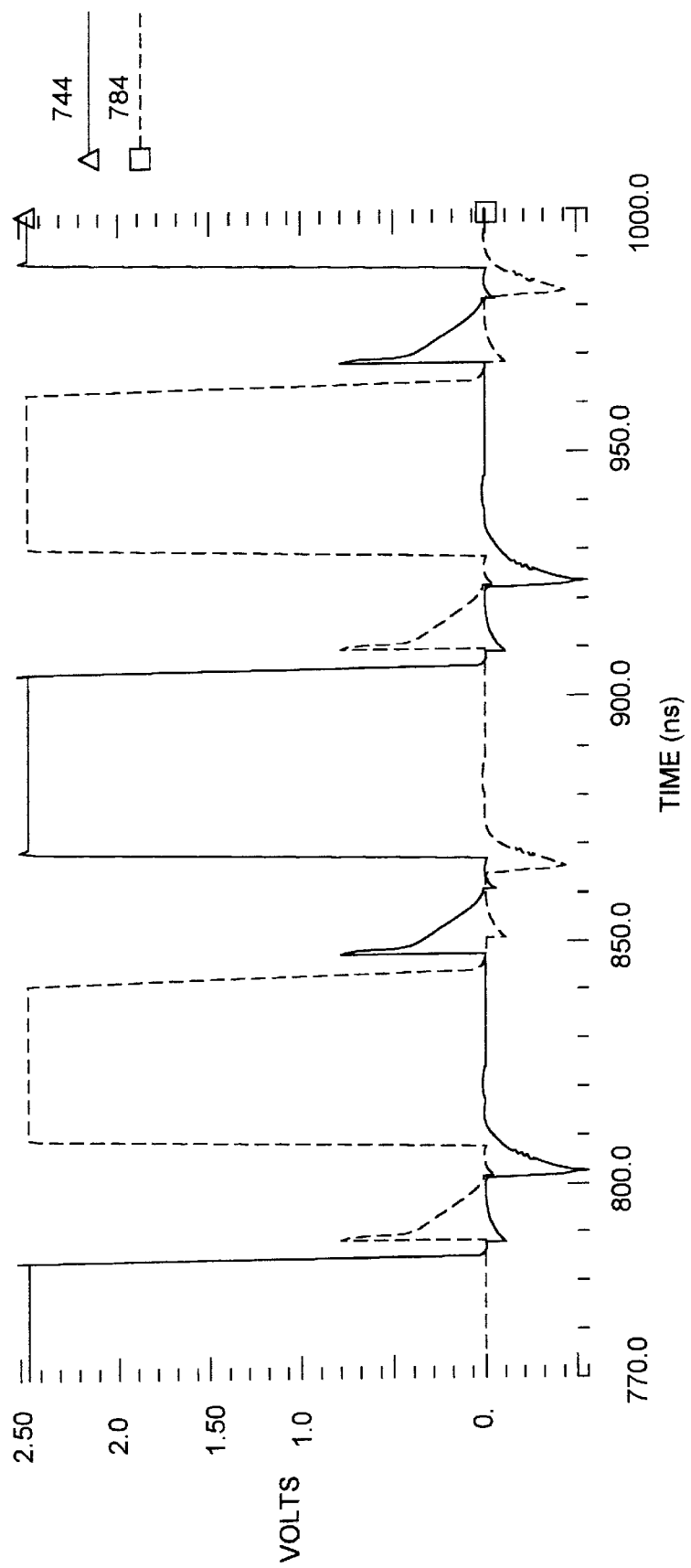
FIG. 9 is a timing diagram of amplified pump timing signals supplied by a pump timing circuit.

FIG. 9 is a timing diagram displaying voltage versus time for the amplified second transfer clock signal 744 and the amplified first transfer clock signal 784 provided by pump timing circuit 700.

Figure 10A:
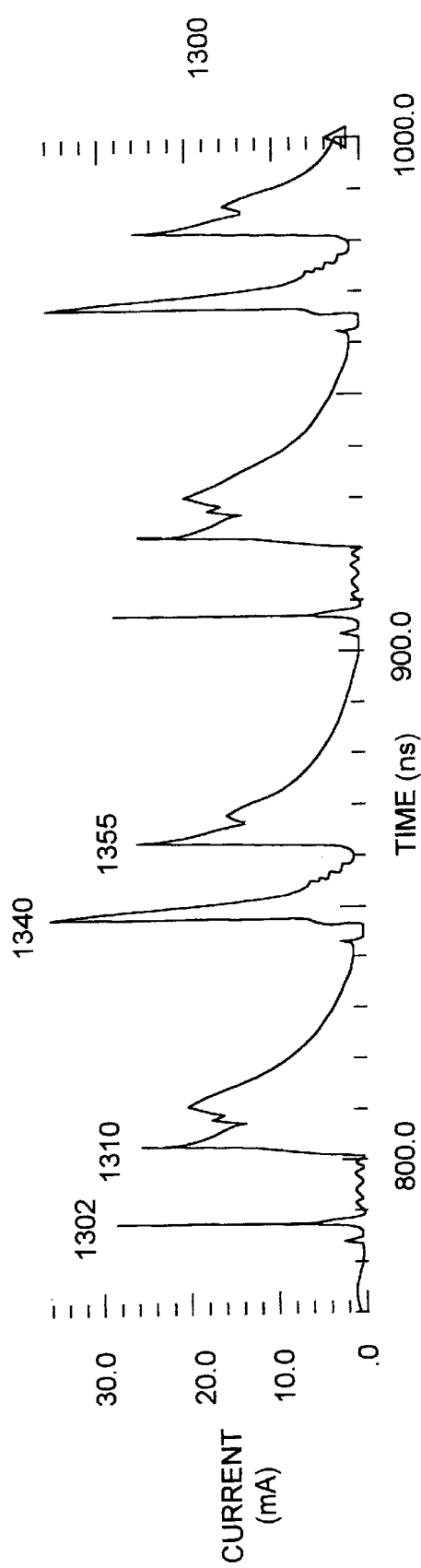
FIG. 10A is a timing diagram of current supplied by the voltage supply of a known charge pump.
Figure 10B:
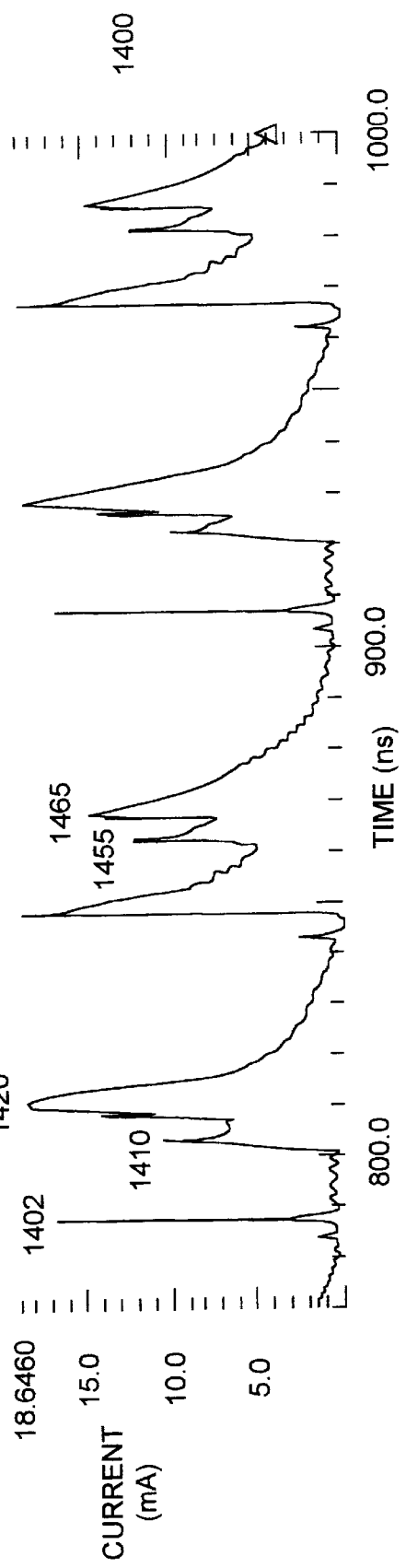
FIG. 10B is a timing diagram of current supplied by the voltage supply of a charge pump.

FIG. 10A is a timing diagram displaying current versus time for current signal 1300 supplied by voltage supply 302. FIG. 10B is a timing diagram displaying current versus time for current signal 1400 supplied by voltage supply 860.

Figure 11A:
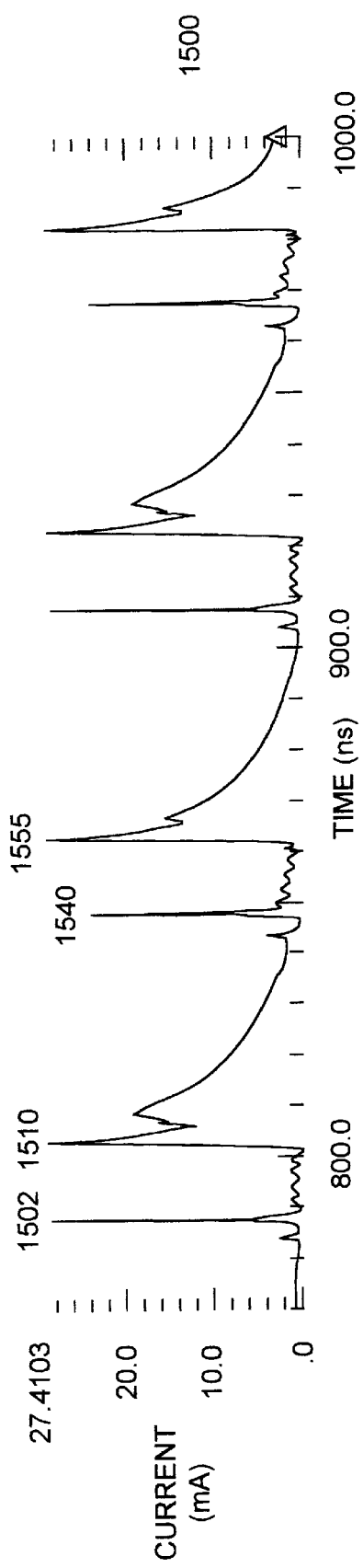
FIG. 11A is a timing diagram of current sunk by the ground of a known charge pump.
Figure 11B:
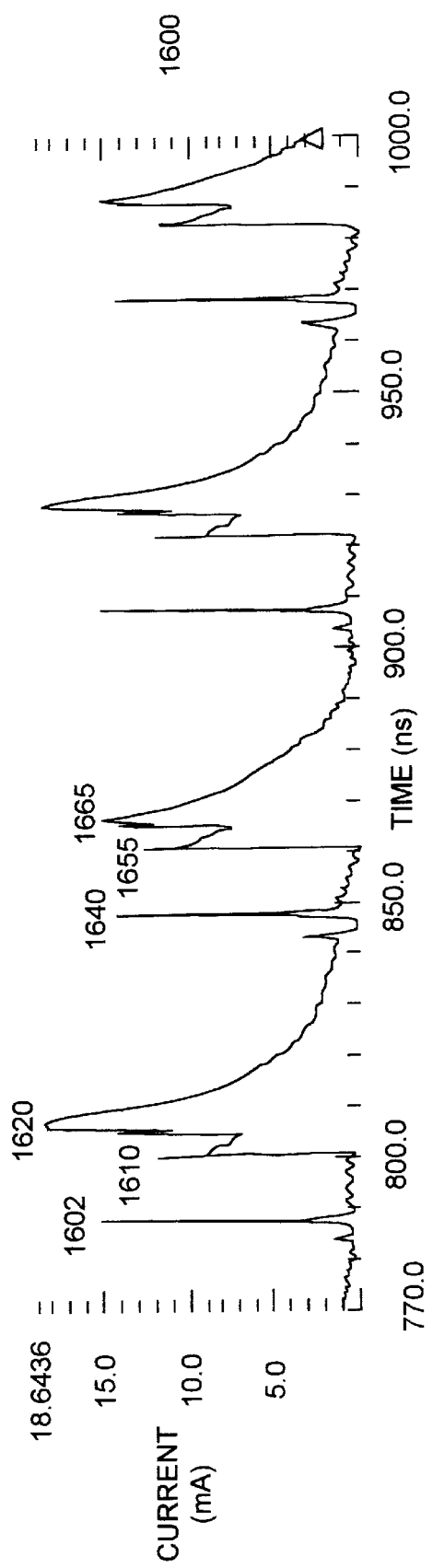
FIG. 11B is a timing diagram of current sunk by the ground of a charge pump.

FIG. 11A is a timing diagram displaying current versus time for current sunk by ground 304. FIG. 11B is a timing diagram displaying current versus time for current signal 1600 sunk by ground 850.

Referring to FIGS. 4–11B, falling edge 624 of the first pump clock signal 620 is received by first inverter series input 712 and processed by the first inverter series 710, resulting in falling edge 1105 of the amplified first pump clock signal 724 driven by the fourth inverter 720. Falling edge 1105 of the amplified first pump clock signal 724 is capacitively coupled to node 934 through the first pump capacitor 942 and to node 974 through third pump capacitor 982. Then, the voltages of node 934 and node 974 drop. Low level 626 of first pump clock signal 620 is similarly processed, and the voltages of node 934 and node 974 continue to be driven down. Thus, the occurrence of falling edge 624 causes current spike 1410 in current signal 1400 and current spike 1610 in current signal 1600.

Following a time delay after falling edge 624 of the first pump clock signal 620, rising edge 684 of first transfer clock signal 680 is received by the fourth inverter series input 772. The rising edge 684 is processed by the fourth inverter series 770 until the fourth inverter series output 782, and further processed by the first routing transistor 810. The first routing transistor 810 helps the fourth inverter 720 to drive down the voltages of node 934 and node 974. High level 686 of first transfer clock signal 680 is similarly processed, and the voltages of node 934 and node 974 continue to be driven down. Thus, rising edge 684 of first transfer clock signal 680 combined with low level 626 of the first pump clock signal 620 result in current spike 1420 in current signal 1400 and current spike 1620 in current signal 1600.

Driving down the voltages of node 934 and node 974 in two components separated by a time delay in the above manner yields advantageous results. Specifically, the current signal spikes are significantly lower. Driving down the voltages of node 934 and node 974 in two components yields current signal 1400 having current spike 1410 and current spike 1420 with respective magnitudes of about 11 mA and 18.6 mA. In contrast, driving down the voltages of node 934 and node 974 in one component yields current signal 1300 having a peak 1310 with a much higher magnitude of about 25 mA. Similarly, driving down the voltages of node 934 and node 974 in two components yields current signal 1600 having current spike 1610 and current spike 1620 with respective magnitudes of about 12 mA and 18.6 mA. In contrast, driving down the voltages of node 934 and node 974 in one component yields current signal 1500 having a peak 1510 with a much higher magnitude of about 27.4 mA.

Rising edge 628 of the first pump clock signal 620 is received by first inverter series input 712 and processed by the first inverter series 710, resulting in rising edge 1125 of the amplified first pump clock signal 724 driven by the fourth inverter 720. Rising edge 1125 of the amplified first pump clock signal 724 is capacitively coupled to node 934 through the first pump capacitor 942 and to node 974 through third pump capacitor 982. Then, the voltages of node 934 and node 974 rise. High level 630 of first pump clock signal 620 is similarly processed, and the voltages of node 934 and node 974 continue to be driven up. Thus, the occurrence of rising edge 628 causes current spike 1440 in current signal 1400 and current spike 1640 in current signal 1600.

Following a time delay after rising edge 628 of the first pump clock signal 620, rising edge 644 of second transfer clock signal 640 is received by the second inverter series input 732. The rising edge 644 is processed by the second inverter series 730 until node 739, and further processed by the second routing transistor 820. The second routing transistor 820 helps the fourth inverter 720 to drive up the voltages of node 934 and node 974. High level 646 of second transfer clock signal 640 is similarly processed, and the voltages of node 934 and node 974 continues to be driven up. Thus, rising edge 644 of second transfer clock signal 640 combined with high level 630 of the first pump clock signal 620 result in current spike 1465 in current signal 1400 and current spike 1665 in current signal 1600.

Driving up the voltages of node 934 and node 974 in two components separated by a time delay in the above manner yields advantageous results. Specifically, the current spikes are much lower. Driving up the voltages of node 934 and node 974 in two components yields current signal 1400 having current spike 1440 and current spike 1465 with respective magnitudes of about 18.6 mA and 15 mA. In contrast, driving up the voltages of node 934 and node 974 in one component yields current signal 1300 having a peak 1340 with a much higher magnitude of about 36 mA. Similarly, driving up the voltages of node 934 and node 974 in two components yields current signal 1600 having current spike 1640 and current spike 1665 with respective magnitudes of about 13 mA and 15 mA. In contrast, driving up the voltages of node 934 and node 974 in one component yields current signal 1500 having a peak 1540 with a much higher magnitude of about 22 mA.

Falling edge 664 of the second pump clock signal 660 is received by third inverter series input 752 and processed by the third inverter series 750, resulting in falling edge 1150 of the amplified second pump clock signal 764 driven by the twelfth inverter 760. Falling edge 1150 of the amplified second pump clock signal 764 is capacitively coupled to node 954 through the second pump capacitor 962. Then, the voltage of node 954 drops. Low level 666 of the second pump clock signal 660 is similarly processed, and the voltage of node 954 continues to be driven down. Thus, the occurrence of falling edge 664 causes current spike 1455 in current signal 1400 and current spike 1655 in current signal 1600.

Following a time delay after falling edge 664 of the second pump clock signal 660, rising edge 644 of second transfer clock signal 640 is received by the second inverter series input 732. The rising edge 644 is processed by the second inverter series 730 until the second inverter series output 742, and further processed by the fourth routing transistor 840. The fourth routing transistor 840 helps the twelfth inverter 760 to drive down the voltage of node 954. High level 646 of second transfer clock signal 640 is similarly processed, and the voltage of node 954 continues to be driven down. Thus, rising edge 644 of second transfer clock signal 640 combined with low level 666 of the second pump clock signal 660 results in current spike 1465 in current signal 1400 and current spike 1665 in current signal 1600.

Driving down the voltage of node 954 in two components separated by a time delay in the above manner yields advantageous results. Specifically, the current signal spikes are a lot lower. Driving down the voltage of node 954 in two components yields current signal 1400 having current spike 1455 and current spike 1465 with respective magnitudes of about 13 mA and 15 mA. In contrast, driving down the voltage of node 954 in one component yields current signal 1300 having a peak 1355 with a much higher magnitude of about 26 mA. Similarly, driving down the voltage of node 954 in two components yields current signal 1600 having current spike 1655 and current spike 1665 with respective magnitudes of about 11 mA and 15 mA. In contrast, driving down the voltage of node 954 in one component yields current signal 1500 having a peak 1555 with a much higher magnitude of about 27 mA.

Rising edge 661 of the second pump clock signal 660 is received by third inverter series input 752 and processed by the third inverter series 750, resulting in rising edge 1102 of the amplified second pump clock signal 764 driven by the twelfth inverter 760. Rising edge 1102 of the amplified second pump clock signal 764 is capacitively coupled to node 954 through the second pump capacitor 962. Then, the voltage of node 954 rises. High level 662 of the second pump clock signal 660 is similarly processed, and the voltage of node 954 continues to be driven up. Thus, the occurrence of rising edge 661 causes current spike 1402 in current signal 1400 and current spike 1602 in current signal 1600.

Following a time delay after rising edge 661 of the second pump clock signal 660, rising edge 684 of the first transfer clock signal 680 is received by the fourth inverter series input 772. The rising edge 684 is processed by the fourth inverter series 770 until node 779, and further processed by the third routing transistor 830. The third routing transistor 830 helps the twelfth inverter 760 to drive up the voltage of node 954. High level 686 of first transfer clock signal 680 is similarly processed, and the voltage of node 954 continues to be driven up. Thus, rising edge 684 of the first transfer clock signal 680 combined with high level 662 of the second pump clock signal 660 results in current spike 1420 in current signal 1400 and current spike 1620 in current signal 1600.

Driving up the voltage of node 954 in two components separated by a time delay in the above manner yields advantageous results. Again, the current signal spikes are much lower. Driving up the voltage of node 954 in two components yields current signal 1400 having current spike 1402 and current spike 1420 with respective magnitudes of about 16 mA and 18.6 mA. In contrast, driving up the voltage of node 954 in one component yields current signal 1300 having a peak 1302 with a much higher magnitude of about 26 mA. Similarly, driving up the voltage of node 954 in two components yields current signal 1600 having current spike 1602 and current spike 1620 with respective magnitudes of about 15 mA and 18.6 mA. In contrast, driving up the voltage of node 954 in one component yields current signal 1500 having a peak 1502 with a much higher magnitude of about 26 mA.

Figure 12A:
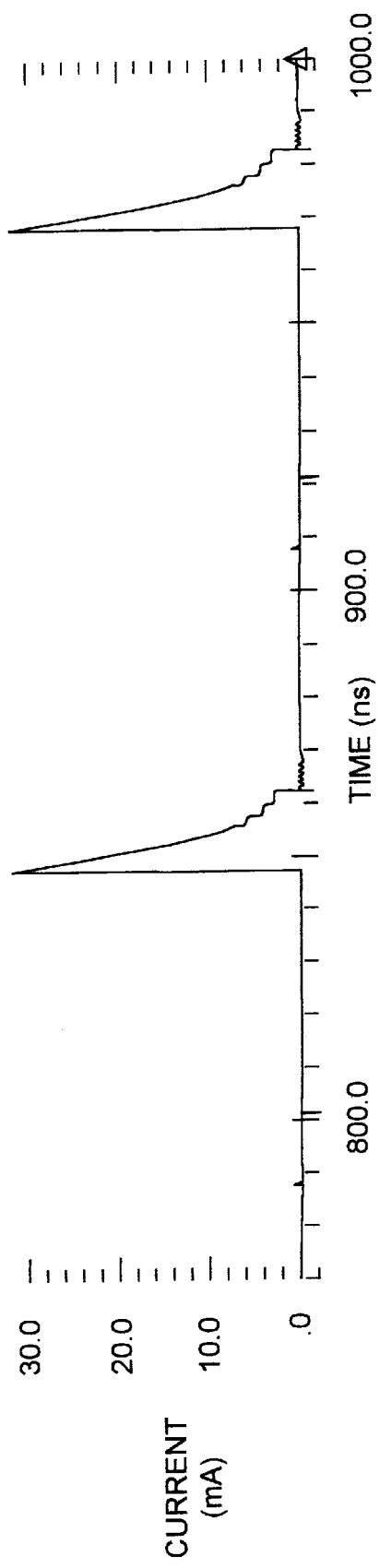
FIG. 12A is a timing diagram of current supplied by the output of a known charge pump.
Figure 12B:
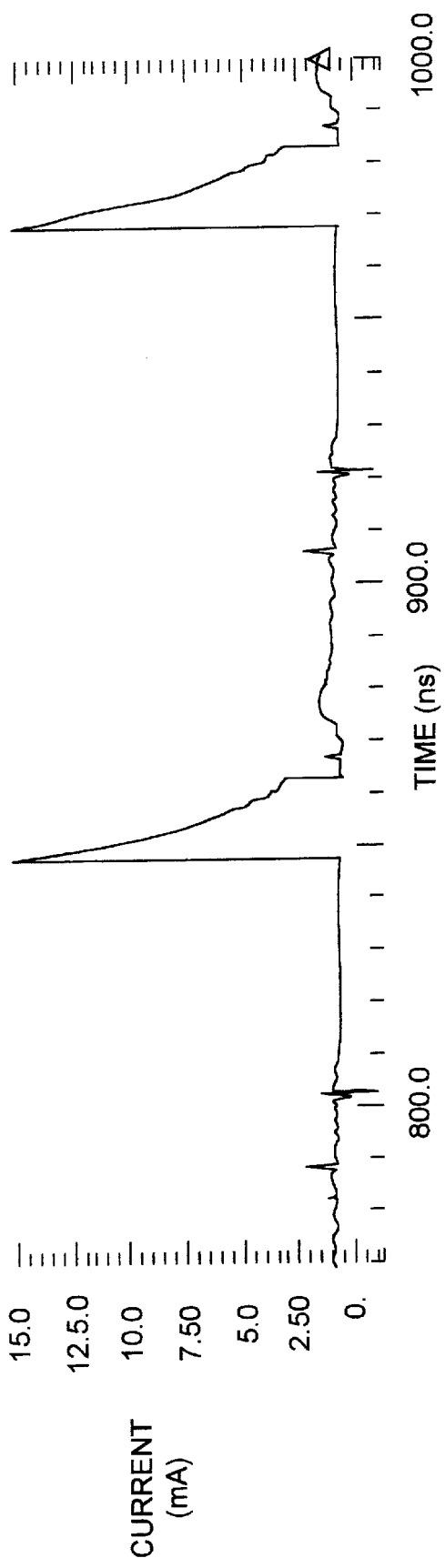
FIG. 12B is a timing diagram of current supplied by the output of a charge pump.

FIG. 12A is a timing diagram displaying current versus time for current supplied by pump stages output 420. FIG. 12B is a timing diagram displaying current versus time for current supplied by pump stages output 920.

Figure 13:
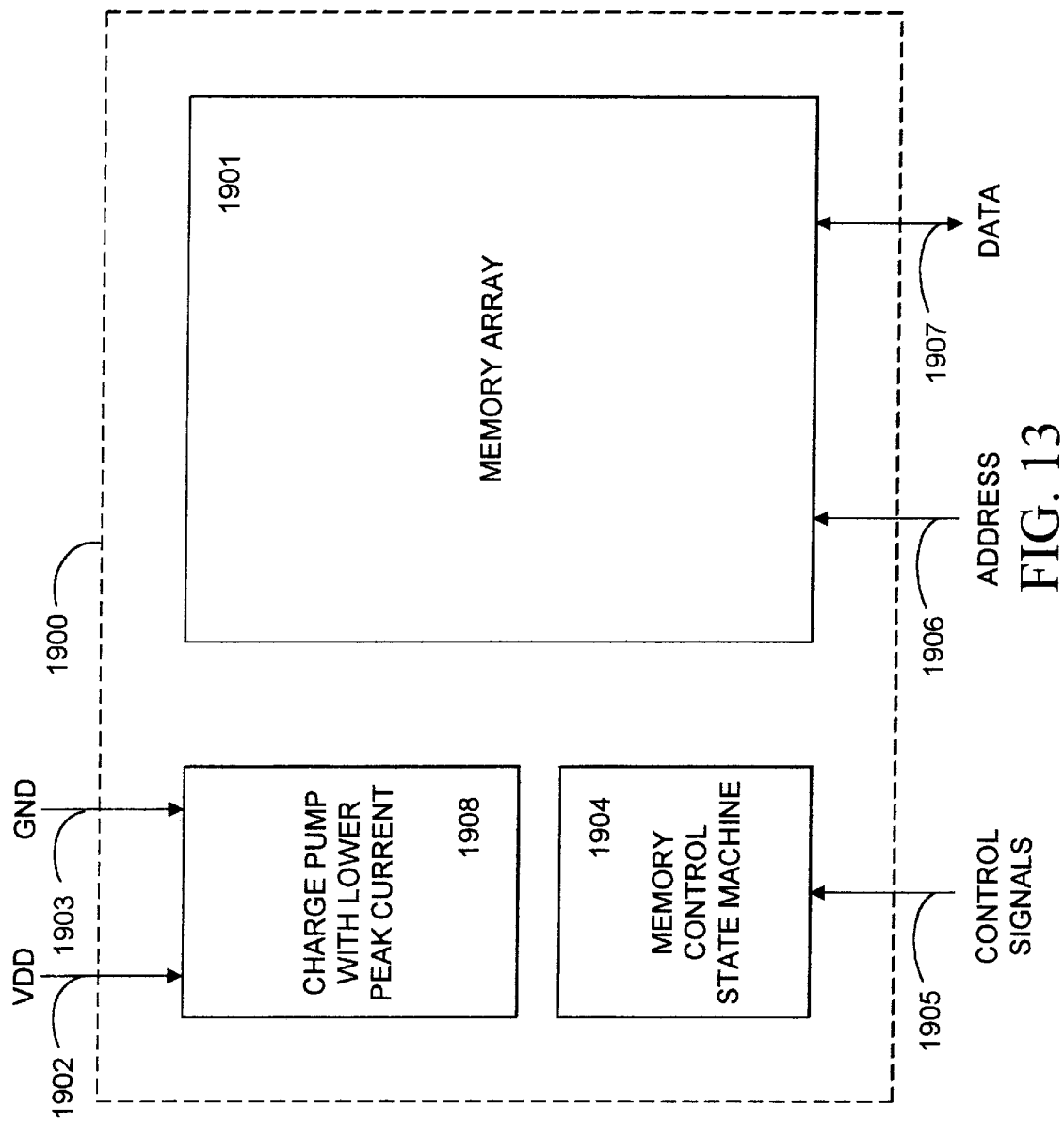
FIG. 13 is a simplified block diagram of an integrated circuit utilizing a four-phase charge pump with lower peak current.

FIG. 13 provides a simplified diagram of an integrated circuit utilizing the charge pump with lower peak current of the present invention. The integrated circuit 1900 includes a semiconductor substrate. A memory array 1901 is included on the device which utilizes operating voltages which are outside the pre-specified range of the supply potential normally applied to the device at supply terminals 1902 and 1903, which are adapted to receive a supply potential VDD and ground.

The integrated circuit in this example includes a memory control state machine 1904, which establishes various operational modes for the memory array 1901. Input signals include control signals 1905 applied to the control state machine 1904, address signals 1906 applied to the memory array circuitry, and data signals 1907 also applied to the memory array 1901. According to the present invention, there is a charge pump with lower peak current 1908 included on the device which is adapted to receive the supply potentials VDD and ground.

FIG. 13 is representative of a wide variety of integrated circuits which include on-chip circuitry that utilizes operational voltages outside the pre-specified range of the supply potential. Memory devices such as flash memory devices are one class of integrated circuits according to the present invention.

Other embodiments of the invention can use other transistor sizes, for example, a different ratio between the widths of the routing transistors and the widths of the transistors in the inverters, and different oxide thicknesses. Another embodiment of the invention is a negative charge pump. Another embodiment of the invention drives charge pump nodes in two components triggered by a single signal. The single signal triggers the first component, and a delayed part of the single signal triggers the second component.

The foregoing description of various embodiments of the invention has been presented for purposes of illustration and description. It is not intended to limit the invention to the precise forms disclosed. Many modifications and equivalent arrangements will be apparent.

What is claimed is:

1. A multiple stage charge pump, comprising:

a first pump capacitor having a first terminal and a second terminal, and the first terminal of the first pump capacitor coupled to a first pump clock signal;

a first transfer capacitor having a first terminal and a second terminal, and the first terminal of the first transfer capacitor coupled to a first transfer clock signal;

a first transistor adapted to transfer charge to the second terminal of the first pump capacitor, and the first transistor having a gate, a first terminal, and a second terminal, and the gate of the first transistor connected to the second terminal of the first transfer capacitor, and the second terminal of the first transistor connected to the second terminal of the first pump capacitor;

a second transistor adapted to selectively couple the gate of the first transistor to the first terminal of the first transistor, and the second transistor having a gate, a first terminal, and a second terminal, and the gate of the second transistor connected to the second terminal of the first pump capacitor, and the second terminal of the second transistor connected to the gate of the first transistor, and the first terminal of the second transistor connected to the first terminal of the first transistor;

a second pump capacitor having a first terminal and a second terminal, and the first terminal of the second pump capacitor coupled to a second pump clock signal;

a second transfer capacitor having a first terminal and a second terminal, and the first terminal of the second transfer capacitor coupled to a second transfer clock signal;

a third transistor adapted to transfer charge to the second terminal of the second pump capacitor, and the third transistor having a gate, a first terminal, and a second terminal, and the gate of the third transistor connected to the second terminal of the second transfer capacitor, and the first terminal of the third transistor connected to the second terminal of the first transistor, and the second terminal of the third transistor connected to the second terminal of the second pump capacitor;

a fourth transistor adapted to selectively couple the gate of the third transistor to the first terminal of the third transistor, and the fourth transistor having a gate, a first terminal, and a second terminal, and the gate of the fourth transistor connected to the second terminal of the second pump capacitor, and the second terminal of the fourth transistor connected to the gate of the third transistor, and the first terminal of the fourth transistor connected to the first terminal of the third transistor; and clock circuitry including one or more of:

a) a first routing transistor having a gate, a first terminal, and a second terminal, and the gate of the first routing transistor coupled to the first transfer clock signal, and the first terminal of the first routing transistor coupled to the first terminal of the first pump capacitor, and the second terminal of the first routing transistor coupled to one of a voltage source, a current source, and a ground;

b) a second routing transistor having a gate, a first terminal, and a second terminal, and the gate of the second routing transistor coupled to the second transfer clock signal, and the first terminal of the second routing transistor coupled to the first terminal of the first pump capacitor, and the second terminal of the second routing transistor coupled to one of a voltage source, a current source, and a ground;

c) a third routing transistor having a gate, a first terminal, and a second terminal, and the gate of the third routing transistor coupled to the first transfer clock signal, and the first terminal of the third routing transistor coupled to the first terminal of the second pump capacitor, and the second terminal of the third routing transistor coupled to one of a voltage source, a current source, and a ground; and d) a fourth routing transistor having a gate, a first terminal, and a second terminal, and the gate of the fourth routing transistor coupled to the second transfer clock signal, and the first terminal of the fourth routing transistor coupled to the first terminal of the second pump capacitor, and the second terminal of the fourth routing transistor coupled to one of a voltage source, a current source, and a ground.

2. The multiple stage charge pump of claim 1, further comprising an amplification circuit coupled to at least one of the first pump clock signal, the first transfer clock signal, the second pump clock signal, and the second transfer clock signal, wherein the amplification circuit increases the power of the at least one of the first pump clock signal, the first transfer clock signal, the second pump clock signal, and the second transfer clock signal.

3. The multiple stage charge pump of claim 1, further comprising at least one of: a) an amplification circuit coupling the first transfer clock signal to the gate of the third routing transistor, b) an amplification circuit coupling the second transfer clock signal to the gate of the second routing transistor, c) an amplification circuit coupling the first transfer clock signal to the gate of the first routing transistor, and d) an amplification circuit coupling the second transfer clock signal to the gate of the fourth routing transistor.

4. The multiple stage charge pump of claim 2, wherein the amplification circuit includes one or more of:
a) a first plurality of inverters including:
a first inverter having an input and an output, and the input of the first inverter coupled to the first pump clock signal;
a second inverter having an input and an output, and the input of the second inverter connected to the output of the first inverter;
a third inverter having an input and an output, and the input of the third inverter connected to the output of the second inverter;
a fourth inverter having an input and an output, and the input of the fourth inverter connected to the output of the third inverter, and the output of the fourth inverter connected to the first terminal of the first pump capacitor;
b) a second plurality of inverters including:
a fifth inverter having an input and an output, and the input of the fifth inverter coupled to the second transfer clock signal;
a sixth inverter having an input and an output, and the input of the sixth inverter connected to the output of the fifth inverter;
a seventh inverter having an input and an output, and the input of the seventh inverter connected to the output of the sixth inverter;
an eighth inverter having an input and an output, and the input of the eighth inverter connected to the output of the seventh inverter, and the output of the eighth inverter connected to the first terminal of the second transfer capacitor;
c) a third plurality of inverters including:
a ninth inverter having an input and an output, and the input of the ninth inverter coupled to the second pump clock signal;
a tenth inverter having an input and an output, and the input of the tenth inverter connected to the output of the ninth inverter;
an eleventh inverter having an input and an output, and the input of the eleventh inverter connected to the output of the tenth inverter;
a twelfth inverter having an input and an output, and the input of the twelfth inverter connected to the output of the eleventh inverter, and the output of the twelfth inverter connected to the first terminal of the second pump capacitor; and
d) a fourth plurality of inverters including:
a thirteenth inverter having an input and an output, and the input of the thirteenth inverter coupled to the first transfer clock signal;
a fourteenth inverter having an input and an output, and the input of the fourteenth inverter connected to the output of the thirteenth inverter;
a fifteenth inverter having an input and an output, and the input of the fifteenth inverter connected to the output of the fourteenth inverter;
a sixteenth inverter having an input and an output, and the input of the sixteenth inverter connected to the output of the fifteenth inverter, and the output of the sixteenth inverter connected to the first terminal of the first transfer capacitor.

5. The multiple stage charge pump of claim 4, wherein the gate of the first routing transistor is connected to the output of the sixteenth inverter, the gate of the second routing transistor is connected to the output of the seventh inverter, the gate of the third routing transistor is connected to the output of the fifteenth inverter, and the gate of the fourth routing transistor is connected to the output of the eighth inverter.

6. A multiple stage charge pump, comprising:
a first pump capacitor having a first terminal and a second terminal, and the first terminal of the first pump capacitor coupled to a first pump clock signal;
a first transfer capacitor having a first terminal and a second terminal, and the first terminal of the first transfer capacitor coupled to a first transfer clock signal;
a first transistor adapted to transfer charge to the second terminal of the first pump capacitor, and the first transistor having a gate, a first terminal, and a second terminal, and the gate of the first transistor connected to the second terminal of the first transfer capacitor, and the second terminal of the first transistor connected to the second terminal of the first pump capacitor;
a second transistor adapted to selectively couple the gate of the first transistor to the first terminal of the first transistor, and the second transistor having a gate, a first terminal, and a second terminal, and the gate of the second transistor connected to the second terminal of the first pump capacitor, and the second terminal of the second transistor connected to the gate of the first transistor, and the first terminal of the second transistor connected to the first terminal of the first transistor;
a second pump capacitor having a first terminal and a second terminal, and the first terminal of the second pump capacitor coupled to a second pump clock signal;
a second transfer capacitor having a first terminal and a second terminal, and the first terminal of the second transfer capacitor coupled to a second transfer clock signal;
a third transistor adapted to transfer charge to the second terminal of the second pump capacitor, and the third transistor having a gate, a first terminal, and a second terminal, and the gate of the third transistor connected to the second terminal of the second transfer capacitor, and the first terminal of the third transistor connected to the second terminal of the first transistor, and the second terminal of the third transistor connected to the second terminal of the second pump capacitor;

a fourth transistor adapted to selectively couple the gate of the third transistor to the first terminal of the third transistor, and the fourth transistor having a gate, a first terminal, and a second terminal, and the gate of the fourth transistor connected to the second terminal of the second pump capacitor, and the second terminal of the fourth transistor connected to the gate of the third transistor, and the first terminal of the fourth transistor connected to the first terminal of the third transistor;

a third pump capacitor having a first terminal and a second terminal, and the first terminal of the third pump capacitor coupled to the first pump clock signal;

a third transfer capacitor having a first terminal and a second terminal, and the first terminal of the third transfer capacitor coupled to the first transfer clock signal;

a fifth transistor adapted to transfer charge to the second terminal of the third pump capacitor, and the fifth transistor having a gate, a first terminal, and a second terminal, and the gate of the fifth transistor connected to the second terminal of the third transfer capacitor, and the first terminal of the fifth transistor connected to the second terminal of the third transistor, and the second terminal of the fifth transistor connected to the second terminal of the third pump capacitor;

a sixth transistor adapted to selectively couple the gate of the fifth transistor to the first terminal of the fifth transistor, and the sixth transistor having a gate, a first terminal, and a second terminal, and the gate of the sixth transistor connected to the second terminal of the third pump capacitor, and the second terminal of the sixth transistor connected to the gate of the fifth transistor, and the first terminal of the sixth transistor connected to the first terminal of the fifth transistor; and clock circuitry including one or more of:

a) a first routing transistor having a gate, a first terminal, and a second terminal, and the gate of the first routing transistor coupled to the first transfer clock signal, and the first terminal of the first routing transistor coupled to at least one of i) the first terminal of the first pump capacitor and ii) the first terminal of the third pump capacitor, and the second terminal of the first routing transistor coupled to one of a voltage source, a current source, and a ground;

b) a second routing transistor having a gate, a first terminal, and a second terminal, and the gate of the second routing transistor coupled to the second transfer clock signal, and the first terminal of the second routing transistor coupled to at least one of i) the first terminal of the first pump capacitor and ii) the first terminal of the third pump capacitor, and the second terminal of the second routing transistor coupled to one of a voltage source, a current source, and a ground;

c) a third routing transistor having a gate, a first terminal, and a second terminal, and the gate of the third routing transistor coupled to the first transfer clock signal, and the first terminal of the third routing transistor coupled to the first terminal of the second pump capacitor, and the second terminal of the third routing transistor coupled to one of a voltage source, a current source, and a ground; and d) a fourth routing transistor having a gate, a first terminal, and a second terminal, and the gate of the fourth routing transistor coupled to the second transfer clock signal, and the first terminal of the fourth routing transistor coupled to the first terminal of the second pump capacitor, and the second terminal of the fourth routing transistor coupled to one of a voltage source, a current source, and a ground.

7. The multiple stage charge pump of claim 6, further comprising an amplification circuit coupled to at least one of the first pump clock signal, the first transfer clock signal, the second pump clock signal, and the second transfer clock signal, wherein the amplification circuit increases the power of the at least one of the first pump clock signal, the first transfer clock signal, the second pump clock signal, and the second transfer clock signal.

8. The multiple stage charge pump of claim 6, further comprising at least one of: a) an amplification circuit coupling the first transfer clock signal to the gate of the third routing transistor, b) an amplification circuit coupling the second transfer clock signal to the gate of the second routing transistor, c) an amplification circuit coupling the first transfer clock signal to the gate of the first routing transistor, and d) an amplification circuit coupling the second transfer clock signal to the gate of the fourth routing transistor.

9. The multiple stage charge pump of claim 7, wherein the amplification circuit includes one or more of:

a) a first plurality of inverters including:
   a first inverter having an input and an output, and the input of the first inverter coupled to the first pump clock signal;
   a second inverter having an input and an output, and the input of the second inverter connected to the output of the first inverter;
   a third inverter having an input and an output, and the input of the third inverter connected to the output of the second inverter;
   a fourth inverter having an input and an output, and the input of the fourth inverter connected to the output of the third inverter, and the output of the fourth inverter connected to at least one of i) the first terminal of the first pump capacitor and ii) the first terminal of the third pump capacitor;

b) a second plurality of inverters including:
   a fifth inverter having an input and an output, and the input of the fifth inverter coupled to the second transfer clock signal;
   a sixth inverter having an input and an output, and the input of the sixth inverter connected to the output of the fifth inverter;
   a seventh inverter having an input and an output, and the input of the seventh inverter connected to the output of the sixth inverter;
   an eighth inverter having an input and an output, and the input of the eighth inverter connected to the output of the seventh inverter, and the output of the eighth inverter connected to the first terminal of the second transfer capacitor;

c) a third plurality of inverters including:
   a ninth inverter having an input and an output, and the input of the ninth inverter coupled to the second pump clock signal;
   a tenth inverter having an input and an output, and the input of the tenth inverter connected to the output of the ninth inverter;
   an eleventh inverter having an input and an output, and the input of the eleventh inverter connected to the output of the tenth inverter;
   a twelfth inverter having an input and an output, and the input of the twelfth inverter connected to the output of the eleventh inverter, and the output of the twelfth inverter connected to the first terminal of the second pump capacitor; and d) a fourth plurality of inverters including:
   a thirteenth inverter having an input and an output, and the input of the thirteenth inverter coupled to the first transfer clock signal;
   a fourteenth inverter having an input and an output, and the input of the fourteenth inverter connected to the output of the thirteenth inverter;
   a fifteenth inverter having an input and an output, and the input of the fifteenth inverter connected to the output of the fourteenth inverter;
   a sixteenth inverter having an input and an output, and the input of the sixteenth inverter connected to the output of the fifteenth inverter, and the output of the sixteenth inverter connected to at least one of i) the first terminal of the first transfer capacitor and ii) the first terminal of the third transfer capacitor.

10. The multiple stage charge pump of claim 9, wherein the gate of the first routing transistor is connected to the output of the sixteenth inverter, the gate of the second routing transistor is connected to the output of the seventh inverter, the gate of the third routing transistor is connected to the output of the fifteenth inverter, and the gate of the fourth routing transistor is connected to the output of the eighth inverter.

11. A charge pump circuit, comprising:
   a pump timing circuit supplying timing signals, including a first pump tinting signal and a first transfer timing signal, and including a second pump timing signal and a second transfer timing signal; and
   a plurality of serially arranged charge pump stages including respective transfer circuits and pump nodes, wherein
      the pump node of a first stage of the plurality of serially connected charge pump stages is coupled to the first pump timing signal via a capacitor to pump the pump node during a first stage pump interval, and the transfer circuit of the first stage is coupled to the first transfer timing signal via a capacitor to transfer charge during a first stage transfer interval from a supply node to the pump node, said first stage pump interval and first stage transfer interval not overlapping;
      the pump node of a second stage of the plurality of serially connected charge pump stages is coupled to the second pump timing signal via a capacitor to pump the pump node during a second stage pump interval, and the transfer circuit of the second stage is coupled to the second transfer timing signal via a capacitor to transfer charge during a stage transfer interval from the pump node of the first stage to the pump node of the second stage, said second stage pump interval overlapping with said first stage transfer interval, and not overlapping with said second stage transfer interval, and said second stage transfer interval overlapping with said first stage pump interval;
      said plurality of serially arranged charge pump stages having a charge pump output, wherein charge is pumped to the charge pump output through the plurality of charge pump stages in response to the timing signals, and the first pump timing signal is driven by a first component to a positive supply and a second component to said positive supply at the beginning of the first stage pump interval, and an onset of said first component is separated by a delay from an onset of said second component, and wherein the onset of the said second component precedes a beginning of the second stage transfer interval.

12. The circuit of claim 11, wherein the first pump timing signal is driven by a third component to a ground reference voltage and a fourth component to said ground reference voltage at an ending of the first stage pump interval, and an onset of said third component is separated by a delay from an onset of said fourth component, and wherein the onset of the said fourth component precedes a beginning of the first stage transfer interval.

13. The circuit of claim 11, wherein the onset of said second component is timed in response to timing of the second transfer timing signal.

14. The circuit of claim 12, wherein the onset of said fourth component is timed in response to timing of the first transfer timing signal.

15. The circuit of claim 11, wherein said pump timing circuit includes a first driver supplying the first pump timing signal, a second driver supplying the first transfer timing signal, a third driver supplying the second pump timing signal, and a fourth driver supplying the second transfer timing signal, said first driver including said first component; and wherein said second component comprises a current path from a supply node to the output of the first driver having a control terminal coupled to the fourth driver.

16. The circuit of claim 11, wherein said pump timing circuit includes a first driver supplying the first pump timing signal, a second driver supplying the first transfer timing signal, a third driver supplying the second pump timing signal, and a fourth driver supplying the second transfer timing signal, said first driver including said first component; and wherein said second component comprises a transistor having a first terminal coupled to a supply node, a second terminal coupled to the output of the first driver, and a gate coupled to an input of the fourth driver.

17. The circuit of claim 12, wherein said pump timing circuit includes a first driver supplying the first pump timing signal, a second driver supplying the first transfer timing signal, a third driver supplying the second pump timing signal, and a fourth driver supplying the second transfer timing signal, said first driver including said third component; and wherein said fourth component comprises a current path from a ground node to the output of the first driver having a control terminal coupled to the second driver.

18. The circuit of claim 12, wherein said pump timing circuit includes a first driver supplying the first pump timing signal, a second driver supplying the first transfer timing signal, a third driver supplying the second pump timing signal, and a fourth driver supplying the second transfer timing signal, said first driver including said third component; and wherein said fourth component comprises a transistor having a first terminal coupled to the output of the first, a second terminal coupled to a ground node, and a gate coupled to an output of the second driver.

19. The circuit of claim 11, wherein said plurality of serially arranged charge pump stages and said timing circuit comprise circuits integrated on an single integrated circuit substrate.

20. The circuit of claim 11, comprising:
   a semiconductor substrate;
   a memory array on the substrate; and wherein the pump timing circuit and the plurality of serially arranged charge pump stages are on the substrate.

21. The circuit of claim 12, comprising a semiconductor substrate;

a memory array on the substrate; and wherein the pump timing circuit and the plurality of serially arranged charge pump stages are on the substrate.

22. A method for controlling a charge pump circuit including a plurality of serially arranged charge pump stages having respective transfer circuits and pump nodes, wherein the pump node of a first stage of the plurality of serially connected charge pump stages is coupled to the first pump timing signal via a capacitor to pump the pump node during a first stage pump interval, and the transfer circuit of the first stage is coupled to the first transfer timing signal via a capacitor to transfer charge during a first stage transfer interval from a supply node to the pump node, said first stage pump interval and first stage transfer interval not overlapping, and wherein the pump node of a second stage of the plurality of serially connected charge pump stages is coupled to the second pump liming signal via a capacitor to pump the pump node during a second stage pump interval, and the transfer circuit of the second stage is coupled to the second transfer timing signal via a capacitor to transfer charge during a stage transfer interval from the pump node of the flint stage to the pump node of the second stage, said second stage pump interval overlapping with said first stage transfer interval, and not overlapping with said second stage transfer interval, and said second stage transfer interval overlapping with said first stage pump interval; the method comprising supplying a first pump timing signal to the pump node of the first stage, a first transfer timing signal to the transfer circuit of the first stage, a second pump timing signal to the pump node of the second stage and a second transfer timing signal to the transfer circuit of the second stage;

wherein the supplying of the first pump timing signal includes turning on a first component coupling the pump node of the first stage to a positive supply and, after a time delay from the turning on of the first component, turning on a second component coupling the pump node of the first stage to said positive supply at the beginning of the first stage pump interval and prior to a beginning of the second stage transfer interval.

23. The method of claim 22, wherein the supplying of the first pump timing signal includes turning on a third component coupling the pump node of the first stage to a ground supply and, after a time delay from the turning on of the third component, turning on a fourth component coupling the pump node of the first stage to said ground supply at an ending of the first stage pump interval and prior to a beginning of a first stage transfer interval.

24. The method of claim 21, including timing the turning on of said second component in response to timing of the second transfer timing signal.

25. The method of claim 22, including timing the turning on said fourth component in response to timing of the first transfer timing signal.

26. The method of claim 22, including timing the turning on of said second component in response to timing of the second transfer timing signal, and timing the turning on said fourth component in response to timing of the first transfer timing signal.

* * * * *